(12) United States Patent
Sharony

(10) Patent No.: US 7,164,929 B2
(45) Date of Patent: Jan. 16, 2007

(54) METHOD AND APPARATUS FOR LOCATION TRACKING IN A MULTI-PATH ENVIRONMENT

(75) Inventor: Jacob Sharony, Dix Hills, NY (US)

(73) Assignee: Symbol Technologies, Inc., Holtsville, NY (US)

(*) Notice: Subject to any disclaimer, the term of this patent is extended or adjusted under 35 U.S.C. 154(b) by 266 days.

(21) Appl. No.: 10/754,428

(22) Filed: Jan. 9, 2004

(65) Prior Publication Data
US 2005/0153713 A1    Jul. 14, 2005

(51) Int. Cl.
*H04B 7/00* (2006.01)
(52) U.S. Cl. ............... 455/500; 455/103; 455/456.5
(58) Field of Classification Search ............ 455/500, 455/103, 456.5; 342/463, 451
See application file for complete search history.

(56) References Cited

U.S. PATENT DOCUMENTS

| | | | |
|---|---|---|---|
| 5,508,707 A | 4/1996 | LeBlanc et al. | |
| 6,104,344 A | 8/2000 | Wax et al. | |
| 6,909,399 B1 * | 6/2005 | Zegelin et al. | 342/463 |
| 2004/0023621 A1 * | 2/2004 | Sugar et al. | 455/103 |
| 2004/0266465 A1 * | 12/2004 | Zegelin et al. | 455/500 |

FOREIGN PATENT DOCUMENTS

WO    WO 00/34799    6/2000

OTHER PUBLICATIONS

International Search Report dated Jun. 6, 2005.

* cited by examiner

*Primary Examiner*—Jean Gelin
*Assistant Examiner*—Phuoc Doan
(74) *Attorney, Agent, or Firm*—Ingrassia, Fisher & Lorenz, P.C.

(57) ABSTRACT

The present invention provides a method of calibrating a wireless tracking system and a method of tracking a mobile unit in a wireless local area network. The method includes providing at least one calibration signal using a mobile unit having a first plurality of antennae while the mobile unit is proximate at least one predetermined location and receiving a plurality of signals at a second plurality of antennae in response to providing the at least one calibration signal. The method also includes determining a portion of a transmission matrix using the plurality of received signals and the at least one calibration signal and associating the portion of the transmission matrix with the predetermined location.

26 Claims, 6 Drawing Sheets

METHOD AND APPARATUS FOR LOCATION TRACKING IN A MULTI-PATH ENVIRONMENT

CROSS REFERENCE TO RELATED APPLICATIONS

This application is related to U.S. patent application Ser. No. 10/738,167 entitled, "A Spatial Wireless Local Area Network," filed on Dec. 17, 2003.

BACKGROUND OF THE INVENTION

1. Field of the Invention

This invention relates generally to wireless networks, and, more particularly, to location tracking of wireless network mobile units in a multi-path environment.

2. Description of the Related Art

A wireless Local Area Network (LAN) is a flexible data communications system that can either replace or extend a traditional, wired LAN to provide added functionality. A traditional, wired LAN sends data packets from one piece of equipment to another across cables or wires. Instead of the wires used in wired LANs, a wireless LAN relies upon radio waves to transfer data between one or more fixed or mobile units and one or more access points. Data is superimposed onto the radio wave through a process called modulation, and the modulated radio wave then acts as the transmission medium. Wireless LANs are used in various vertical and horizontal applications (e.g., retail, manufacturing, logistics, healthcare, education, public space, etc.). Recently, there has been a surge in the deployment of wireless infrastructure networks to provide wireless internet access services, especially in public "hot spots" covering airports, hotels, coffee shops, and the like.

The ability to track the locations of the mobile devices may increase the utility of a wireless LAN. For example, the wireless LAN may be able to provide location-based services, such as phone calls, e-mails, location-dependent information, and the like, to mobile subscribers as they move between and within different locations, e.g. around the interior of a warehouse, from home to the office, from indoors to outdoors, and the like. For another example, location tracking may be used to manage assets in warehouses, hospitals, docking yards, and the like, by fixing radio frequency tags to mobile assets and thereby making them "visible" to people and information systems via the wireless LAN.

One conventional technique for tracking mobile devices and/or radio frequency tags, often referred to as a Received Signal Strength Indicator (RSSI) method, uses measurements of power received from the mobile device and/or radio frequency tag at several access points to estimate the location of the mobile device and/or radio frequency tag. A second conventional technique for tracking mobile devices and/or radio frequency tags, often referred to as a Time Difference Of Arrival (TDOA) method, measures the arrival times of signals transmitted between the mobile device and/or radio frequency tag and several access points, and then uses triangulation to estimate the location of the mobile device and/or radio frequency tag. However, both the RSSI and TDOA methods suffer significant degradation in accuracy and/or overall system performance when they are used to track locations mobile devices and/or radio frequency tags in rich multi-path environments.

SUMMARY OF THE INVENTION

In one aspect of the instant invention, a method of calibrating a wireless tracking system is provided. The method includes providing at least one calibration signal using a mobile unit having a first plurality of antennae while the mobile unit is proximate at least one predetermined location and receiving a plurality of signals at a second plurality of antennae in response to providing the at least one calibration signal. The method also includes determining a portion of a transmission matrix using the plurality of received signals and the at least one calibration signal and associating the portion of the transmission matrix with the predetermined location.

In another aspect of the present invention, a method of tracking a mobile unit in a wireless local area network is provided. The method includes receiving a plurality of signals at a first plurality of antennae, determining a portion of a transmission matrix using the plurality of received signals, and associating the portion of the transmission matrix with a predetermined location.

In yet another aspect of the present invention, a wireless local area network is provided. The wireless local area network includes at least one mobile unit having a first plurality of antennae capable of providing at least one signal and an access point having a second plurality of antennae capable of receiving a plurality of signals in response to the at least one signal provided by the at least one mobile unit. The access point is capable of determining a portion of a transmission matrix using the plurality of received signals and associating the portion of the transmission matrix with a predetermined location.

BRIEF DESCRIPTION OF THE DRAWINGS

The invention may be understood by reference to the following description taken in conjunction with the accompanying drawings, in which like reference numerals identify like elements, and in which.

Figure 1:
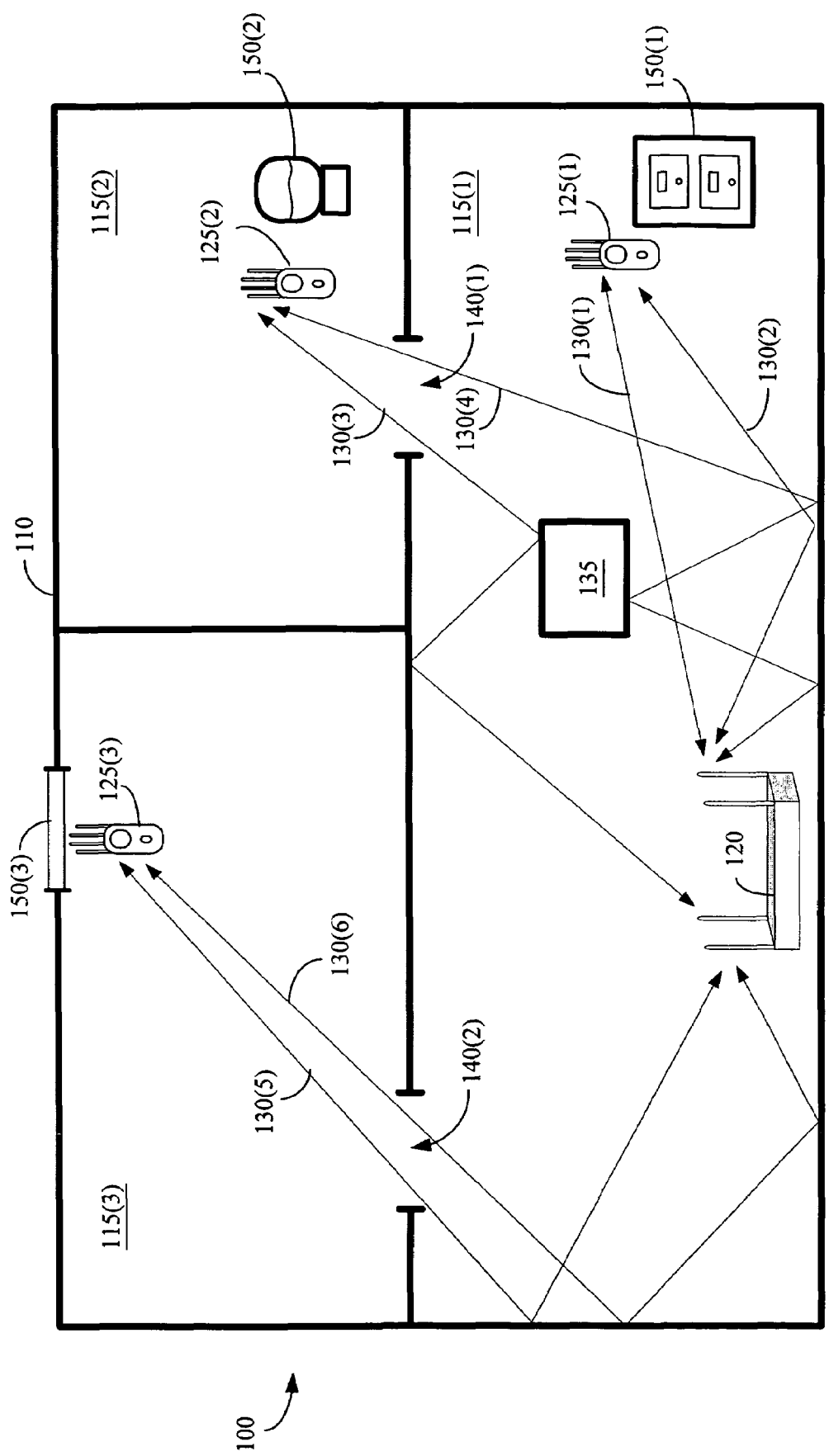
FIG. 1 shows one exemplary embodiment of a wireless local area network including at least one access point and a plurality of mobile units.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows one exemplary embodiment of a wireless local area network 100. In the illustrated embodiment, the wireless local area network 100 is deployed within an interior space 110, which includes a plurality of rooms 115(1–3). However, it will be appreciated by those of ordinary skill in the art that the present invention is not limited to wireless local area networks 100 that are deployed within interiors such as the interior space 110. In various alternative embodiments, some or all of the wireless local area network 100 may be deployed at any desirable location inside or outside of the interior space 110, as well as in any desirable number of rooms within the interior space 110.

The wireless local area network 100 shown in FIG. 1 includes an access point 120 and mobile units 125(1–3). Although three mobile units 125(1–3) are shown in the exemplary embodiment of the wireless local area network 100, persons of ordinary skill in the art will appreciate that the present invention is not limited to three mobile units 125(1–3) and that, in alternative embodiments, more or fewer mobile units 125(1–3) may be used. Moreover, the number of mobile units 125(1–3) may vary over time. For example, the number of mobile units 125(1–3) may increase as mobile units 125(1–3) are turned on or otherwise added to the wireless local area network 100. For another example, the number of mobile units 125(1–3) may decrease as mobile units 125(1–3) are turned off or otherwise removed from the wireless local area network 100.

In various embodiments, the mobile units 125(1–3) may be cellular telephones, personal data assistants, bar code scanners, portable computers, desktop computers, and the like. Although the mobile units 125(1–3) shown in FIG. 1 are capable of transmitting and receiving signals, the present invention is not so limited. In various alternative embodiments, the mobile units 125(1–3) may only be capable of transmitting signals to the access point 120. For example, the mobile units 125(1–3) may be radio-frequency tags that may be associated with some other object. For example, the mobile units 125(1–3) may be radio-frequency tags that are affixed to a box, a crate, a piece of equipment, or any other object. For another example, the mobile units 125(1–3) may represent a single device, such as may be used to calibrate the wireless tracking system described below, that may transmit a signal from a plurality of locations. The term "mobile unit" will therefore be understood to include any device or object whose location may be determined in the manner described in detail below.

Voice and/or data signals may be transmitted between the access point 120 and the mobile units 125(1–3). In one embodiment, the voice and/or data signals may be transmitted between the access point 120 and the mobile units 125(1–3) using a modulated radio signal, such as a 2.4 GHz modulated carrier radio signal. However, the present invention is not limited to any particular frequency radio signal, except as set forth in the appended claims. For example, in one alternative embodiment, a 5 GHz modulated carrier radio signal may be used. The voice and/or data signals typically travel between the access point 120 and the mobile units 125(1–3) along a plurality of paths 130(1–6). In the interest of clarity, only six paths 130(1–6) are shown in FIG. 1. However, persons of ordinary skill in the art will appreciate that the number of possible paths between the access point 120 and the mobile units 125(1–3) is essentially infinite.

The distribution of potential paths between the access point 120 and the mobile units 125(1–3) depends upon the location of the access point 120 and the mobile units 125(1–3), the configuration of the interior space 110 and the rooms 115(1–3), as well as the location and/or shape of any other obstructions, such as the obstruction 135 shown in FIG. 1. For example, the path 130(1) may pass substantially directly from the mobile unit 125(1) to the access point 120, whereas the path 130(2) may reflect from a wall of the room 115(1). For another example, the paths 130(3–4) between the mobile unit 125(2) and the access point 120 may pass from the room 115(2) to the room 115(1) via a doorway 140(1), and may then reflect from one or more walls of the room 115(1). For yet another example, the paths 130(5–6) between the mobile unit 125(3) and the access point 120 may pass from the room 115(3) to the room 115(1) via a doorway 140(2), and may then reflect from one or more walls of the room 115(1). Although not shown in FIG. 1, additional paths may pass through the walls and/or obstructions 135.

The voice and/or data signals transmitted by the access point 120 and/or the mobile units 125(1–3) may differ from the corresponding voice and/or data signals received by the access point 120 and/or the mobile units 125(1–3). For example, variations in the lengths of the paths 130(1–6) may result in variations in the signal amplitude, phase, arrival time, frequency distribution, intensity, and other like attributes of signals transmitted between the access point 120 and the mobile units 125(1–3). For another example, variations in the number of reflections along the paths 130(1–6), as well as variations in the reflectance of the reflecting surfaces, may also result in variations in the amplitude, phase, frequency distribution, intensity, and other like attributes of signals transmitted between the access point 120 and the mobile units 125(1–3). The aforementioned changes in the voice and/or data signals as they travel along the plurality of paths 130(1–6) between the access point 120 and the mobile units 125(1–3) are generally referred to by persons of ordinary skill in the art as multipath fading of the voice and/or data signals.

At the time that signals are transmitted along the paths 130(1–6), each of the mobile units 125(1–3) may be proximate one of a plurality of pre-determined locations 150 (1–3). In the illustrated embodiment, the pre-determined locations 150(1–3) may be a file cabinet 150(1), a water cooler 150(2), and a window 150(3). However, persons of ordinary skill in the art having benefit of the present disclosure will appreciate that the plurality of pre-determined locations 150(1–3) may be associated with any desirable object. Furthermore, the plurality of pre-determined locations 150(1–3) may not be associated with a physical object.

For example, the plurality of pre-determined locations 150 (1–3) may be a plurality of grid points, coordinates, and the like.

As will be described in detail below, multi-path fading of the voice and/or data signals transmitted by the access point 120 and/or the mobile units 125(1–3) may be used to determine a location of the mobile units 125(1–3). For example, the multi-path fading may be used to determine that the mobile unit 125(1) is proximate the file cabinet 150(1), the mobile unit 125(2) is proximate the water cooler 150(2), and the mobile unit 125(3) is proximate the window 150(3). Although not necessary for the practice of the present invention, location-dependent services may be provided to the mobile units 125(1–3) using the determined locations.

Figure 2A:
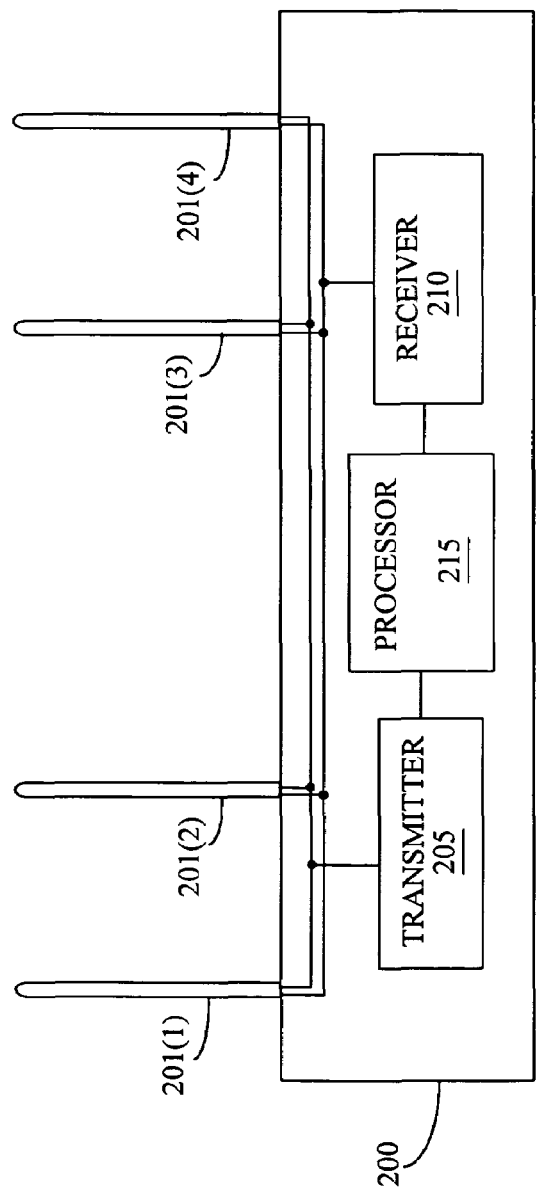
FIG. 2A illustrates one embodiment of an access point, such as the access point shown in FIG. 1.

FIG. 2A illustrates one embodiment of an access point 200, such as the access point 120 shown in FIG. 1. The access point 200 includes a plurality of antennae 201(1–4) that may be coupled to a transmitter 205 and a receiver 210. The antennae 201(1–4) are each capable of transmitting an independent signal provided by the transmitter 205 and of receiving an independent signal that may be provided to the receiver 210. For example, the antennae 201(1–4) may be capable of concurrently receiving or transmitting up to four independent modulated radio signals. Although the embodiment of the access point 200 illustrated in FIG. 2A includes four antennae 201(1–4) capable of receiving or transmitting up to four independent signals, the present invention is not so limited. In various alternative embodiments, any desirable plurality of antennae 201(1–4), each capable of receiving or transmitting an independent signal, may be included in the access point 200.

Figure 2B:
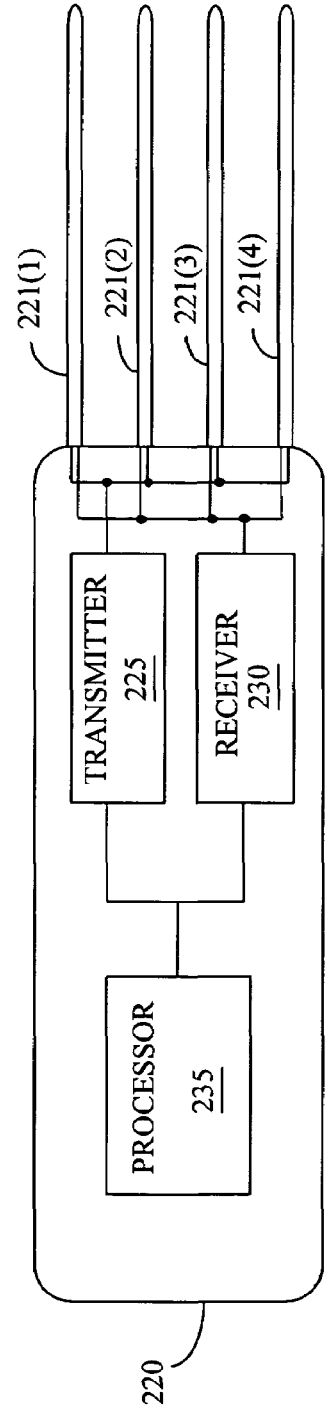
FIG. 2B illustrates one embodiment of a mobile unit, such as the mobile unit shown in FIG. 1.

FIG. 2B illustrates one embodiment of a mobile unit 220, such as the mobile units 125(1–3) shown in FIG. 1. The mobile unit 220 includes a plurality of antennae 221(1–4) that may be coupled to a transmitter 225. In one embodiment, the plurality of antennae 221(1–4) may also be coupled to a receiver 230. However, the receiver is optional and not necessary for the practice of the present invention. For example, the mobile unit 220 may be a radio-frequency tag that includes the transmitter 225 but not the receiver 230. The antennae 221(1–4) are each capable of transmitting an independent signal provided by the transmitter 225, as described above. However, in alternative embodiments, any desirable plurality of the antennae 221(1–4) may be used to transmit the independent signal provided by the transmitter 225. For example, the transmitter 225 may provide the independent signal to the three antennae 221(1–3).

In embodiments that include the receiver 230, the antennae 221(1–4) are each capable of receiving an independent signal that may be provided to the receiver 230. For example, the antennae 221(1–4) may be capable of receiving up to four independent modulated radio signals. Although the embodiment of the mobile unit 220 illustrated in FIG. 2A includes four antenna 221(1–4), the present invention is not so limited. In various alternative embodiments, any desirable plurality of antenna 221(1–4), each capable of receiving or transmitting an independent signal at a substantially common frequency, may be included in the mobile unit 220.

Figure 3A:
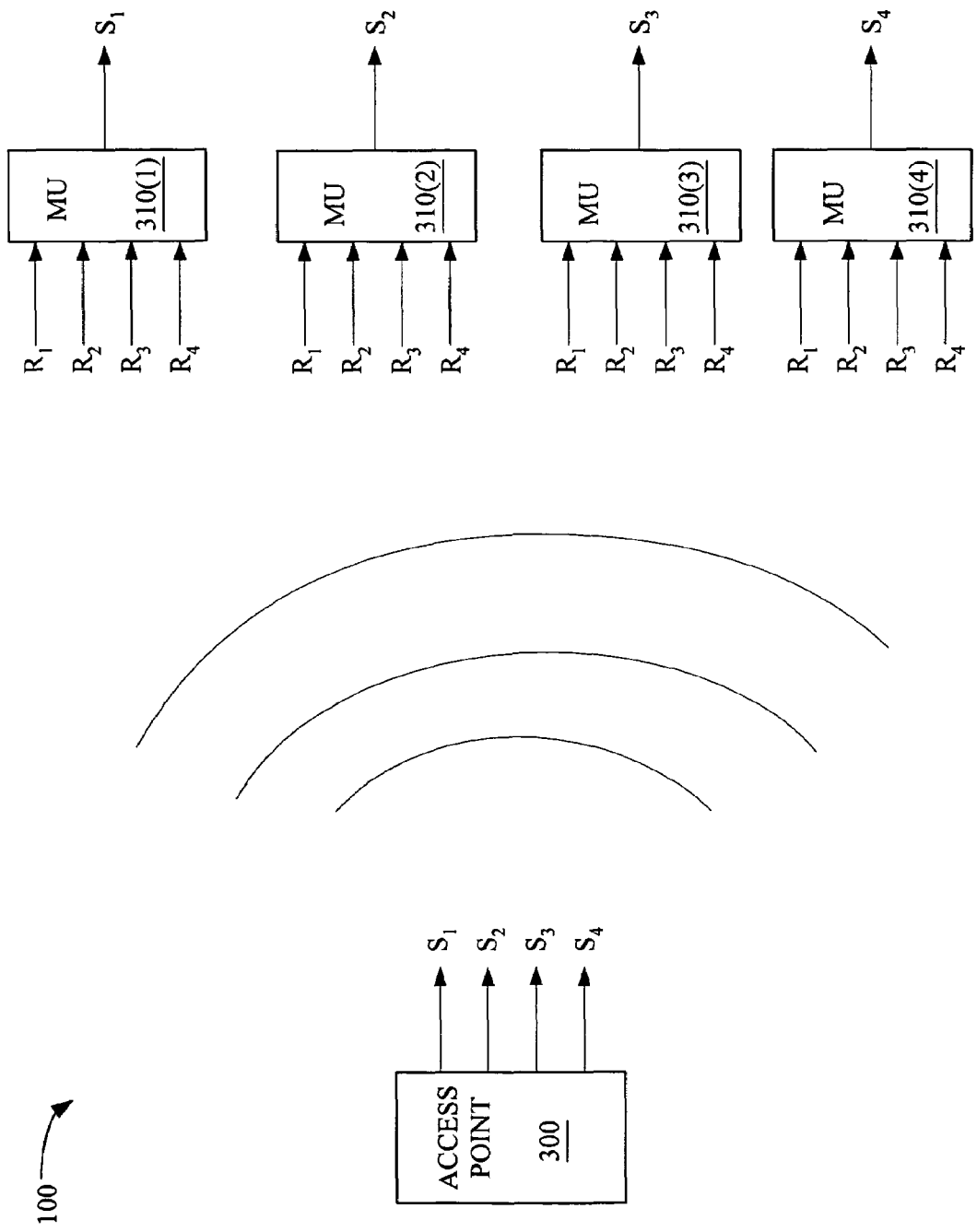
FIG. 3A conceptually illustrates an exemplary embodiment of a downstream transmission that may be performed by the wireless local area network shown in FIG. 1.

FIG. 3A conceptually illustrates an exemplary embodiment of a downstream transmission using the wireless local area network 100. In the illustrated exemplary embodiment, the wireless local network 100 includes an access point 300 and mobile units 310(1–4), indicated by the abbreviation MU. Symbols $S_1$, $S_2$, $S_3$, and $S_4$ may be transmitted by the access point 300. For example, the access point 300 may transmit symbols $S_1$, $S_2$, $S_3$, and $S_4$ at a substantially common frequency using four or more antennae, such as the antennae 201(1–4) shown in FIG. 2. Due to the aforementioned multi-path fading, the mobile units 310(1–4) may receive the signals $R_1$, $R_2$, $R_3$, and $R_4$, which are related to the transmitted symbols $S_1$, $S_2$, $S_3$, and $S_4$ by the matrix equation $$R_i = [H \cdot \vec{S} + \vec{n}]_j = \sum_j a_{ij} S_j + n_i,$$

where $a_{ij}$ are elements of a transmission matrix, H, and $n_i$ represents noise.

The mobile units 310(1–4) estimate the transmission matrix $a_{ij}$ using at least a portion of the received signals $R_i$. In one embodiment, each of the transmitted symbols, $S_j$, includes a predetermined training sequence, $T_j$, indicative of the transmission channel j. For example, the training sequence, $T_j$, may include a predetermined plurality of pilot sequences, $p_j$, each of which is transmitted as a portion of a preamble signal. The access point 300 may send each of the plurality of pilot sequences $p_j$ in one of a sequence of successive predetermined time slots. The mobile units 310(1–4) identify the pilot sequences $p_j$ transmitted by the access point 300 in the predetermined time slots and estimate at least a portion of the transmission matrix using the equation: $a_{ij}=R_i/p_j$.

Figure 3B:
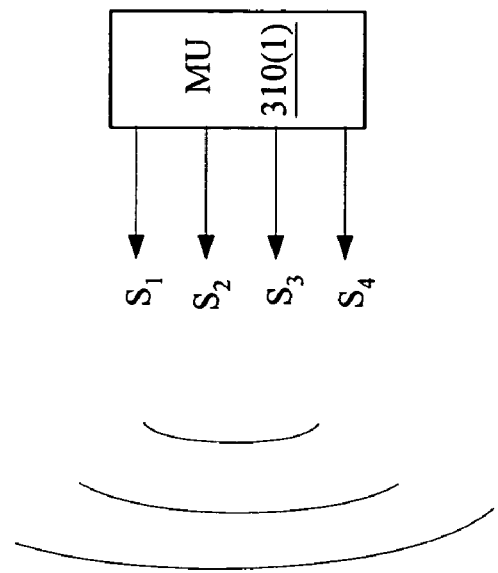
FIG. 3B conceptually illustrates an exemplary embodiment of an upstream transmission that may be performed by the wireless local area network shown in FIG. 1.
Figure 3B:
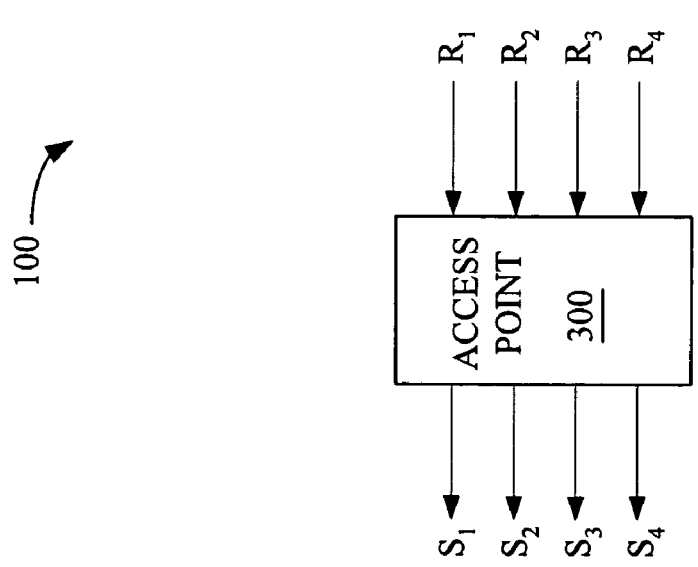

FIG. 3B conceptually illustrates an exemplary embodiment of an upstream transmission using the wireless local area network 100. In the illustrated exemplary embodiment, symbols $S_1$, $S_2$, $S_3$, and $S_4$ may be transmitted at different times by the mobile unit 310(1). Due to the aforementioned multi-path fading, the antennae 201(1–4) on the access point 300 may receive the signals $R_1$, $R_2$, $R_3$, and $R_4$, which are related to the transmitted symbols $S_1$, $S_2$, $S_3$, and $S_4$ by the matrix equation $$R_i = [H \cdot \vec{S} + \vec{n}]_j = \sum_j a_{ij} S_j + n_i,$$

where $a_{ij}$ are elements of a transmission matrix, H, and $n_i$ represents noise.

The access point 300 estimates the transmission matrix $a_{ij}$ using at least a portion of the received signals $R_i$, which in this illustrative embodiment are received by at least the four antennae 201(1–4). In one embodiment, each of the received symbols, $R_i$, includes a predetermined training sequence, $T_j$, indicative of the transmission channel j, which is transmitted by one of the plurality of antennae coupled to the mobile unit 310(1). The training sequence, $T_j$, may include a predetermined pilot sequence, $p_j$, that is transmitted as a portion of a preamble signal. For example, the mobile unit 310(1) may send pilot sequences $p_j$ in each of a sequence of successive predetermined time slots. The access point 300 may identify the pilot sequences $p_j$ transmitted by the mobile unit 310(1) in the predetermined time slots and estimate the transmission matrix corresponding to the mobile unit 310(1) using the equation:

$$a_{ij} \times R_i/P_j.$$

Figure 4:
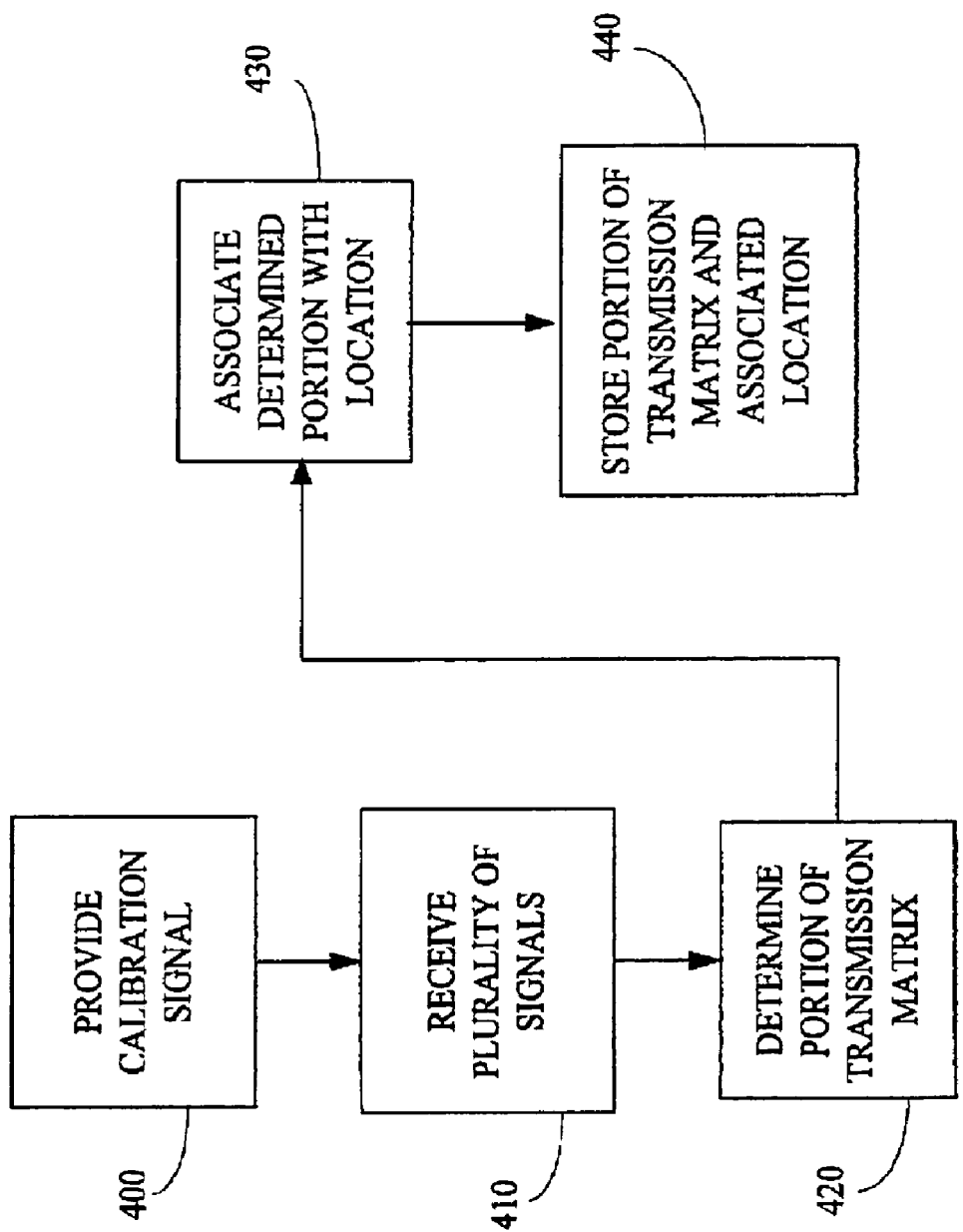
FIG. 4 shows an exemplary method of calibrating a wireless tracking system that may be implemented in the wireless local area network shown in FIG. 1.

FIG. 4 shows an exemplary method of calibrating a wireless tracking system that may be implemented in the wireless local area network 100. In one embodiment, at least one calibration signal may be provided (at 400) using a mobile unit that includes a first plurality of antennae, such as the mobile unit 220 shown in FIG. 2B. The calibration signal is provided (at 400) while the mobile unit is proximate at least one predetermined location. For example, the calibration signal may be provided (at 400) while the mobile unit is proximate the file cabinet 150(1), the water cooler 150(2), and/or the window 150(3) shown in FIG. 1. However, as noted above, the calibration signal may be provided (at 400) while the mobile unit is proximate non-physical locations such as grid points, coordinates, and the like.

A plurality of signals is received (at 410) at a second plurality of antennae in response to providing the at least one calibration signal. For example, the plurality of signals may be a plurality of signals that traveled along different paths from the four antennae 221(1–4) coupled to the mobile unit 220, shown in FIG. 2B, to the four antennae 201(1–4) coupled to the access point 200, shown in FIG. 2A.

A portion of a transmission matrix is determined (at 420) using the plurality of received signals and the at least one calibration signal. For example, the calibration signal may include one or more pilot sequences. As discussed in detail above, the access point 300 shown in FIG. 3B may identify the one or more pilot sequences $p_j$ transmitted by the mobile unit 310(1). The access point 300 may then determine (at 420) the elements of the transmission matrix corresponding to the mobile unit 310(1) using the one or more pilot sequences. Alternatively, the access point 300 may use the plurality of received signals and the at least one calibration signal to determine (at 420) one or more characteristic parameters of the transmission matrix. For example, the access point 300 may determine (at 420) one or more singular values of the transmission matrix. For another example, the access point 300 may determine (at 420) one or more eigenvalues and/or eigenvectors of the transmission matrix.

The determined portion of the transmission matrix is associated (at 430) with the predetermined location. For example, the elements of the transmission matrix corresponding to the mobile unit 310(1) may be associated (at 430) with the predetermined location. For another example, the one or more singular values of the transmission matrix may be associated (at 430) with the predetermined location. In one embodiment, the determined portion of the transmission matrix and the associated predetermined location may be stored in, for example, a database.

Figure 5:
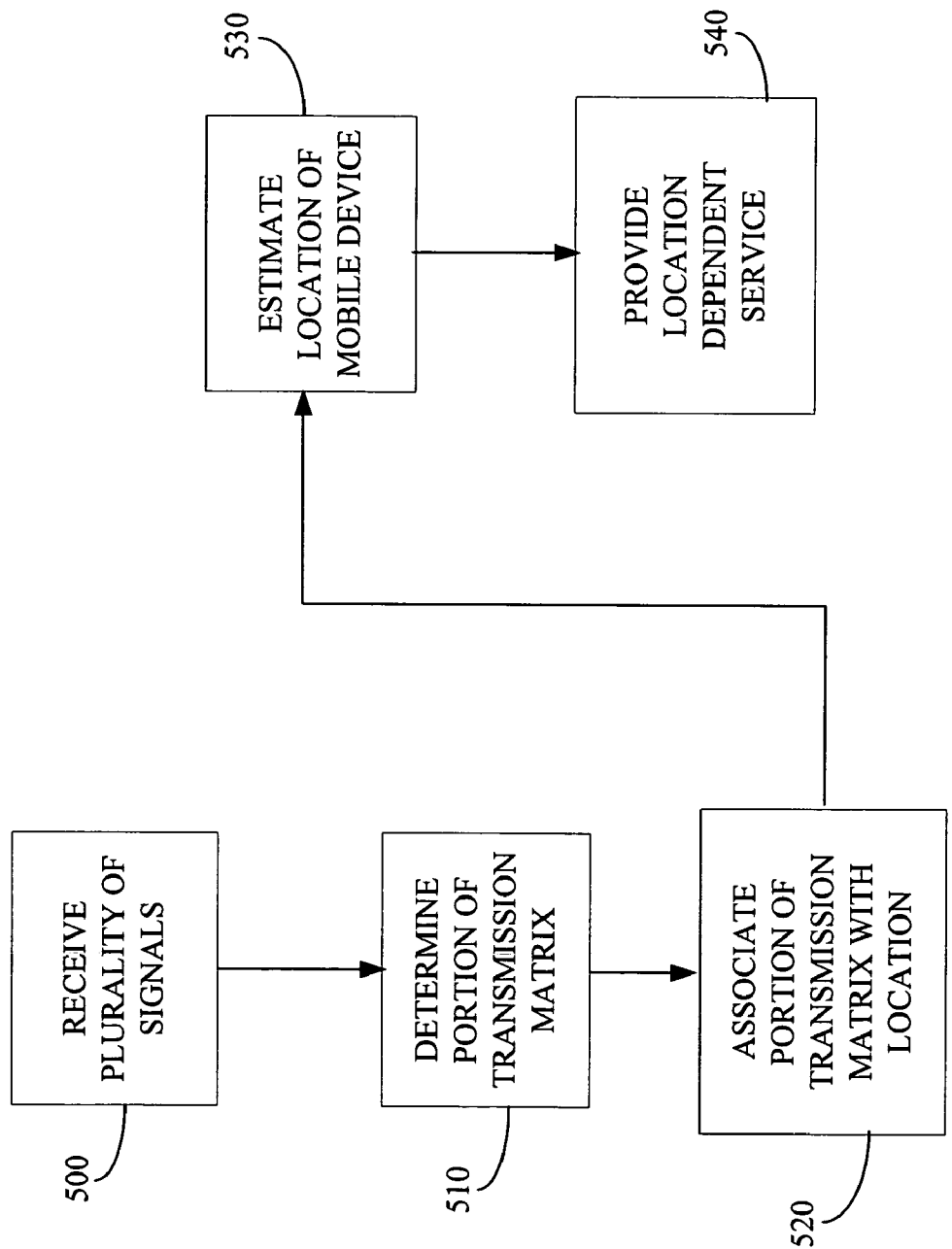
FIG. 5 shows an exemplary method of tracking a mobile unit that may be implemented in the wireless local area network shown in FIG. 1.

FIG. 5 shows an exemplary method of tracking a mobile unit that may be implemented in the wireless local area network 100. A plurality of signals is received (at 500) at a first plurality of antennae. In a first exemplary embodiment, which will be referred to hereinafter as an "upstream" embodiment, the first plurality of antennae are coupled to an access point, which receives (at 500) a plurality of signals that traveled along different paths from a second plurality of antennae coupled to a mobile unit. In a second exemplary embodiment, which will be referred to hereinafter as a "downstream" embodiment, the first plurality of antennae are coupled to one or more mobile units, which receive (at 500) a plurality of signals that traveled along different paths from a second plurality of antennae coupled to the access point.

A portion of a transmission matrix is determined (at 510) using the plurality of received signals. In the upstream embodiment, the access point determines (at 510) the portion of the transmission matrix using the plurality of signals received (at 500) at the access point in response to a plurality of signals provided by a mobile unit, as described above. In various alternative upstream embodiments, the access point may determine (at 510) all the elements of the transmission matrix, one or more singular values of the transmission matrix, one or more eigenvalues of the transmission matrix, and/or one or more eigenvectors of the transmission matrix.

In the downstream embodiment, one or more mobile units determine (at 510) a portion of the transmission matrix corresponding to each mobile unit using the plurality of signals received (at 500) in response to one or more signals provided by the access point. In various alternative downstream embodiments, the mobile unit may determine (at 510) all the elements of the transmission matrix, one or more singular values of the transmission matrix, one or more eigenvalues of the transmission matrix, and/or one or more eigenvectors of the transmission matrix. The mobile unit then transmits the determined portion of the transmission matrix to the access point. However, it will be appreciated by persons of ordinary skill in the art that some of the aforementioned calculations may be performed by the access point. For example, each mobile unit may determine (at 510) the elements of the transmission matrix and transmit the determined elements to the access point, which may then determine (at 510) one or more characteristic parameters of the transmission matrix, such as singular values, eigenvectors, eigenvalues, and the like, using the transmitted elements.

In both the upstream and the downstream embodiments, the portion of the transmission matrix is associated (at 520) with a predetermined location. In one embodiment, the portion of the transmission matrix is associated (at 520) with the predetermined location by determining a nearest neighbor from among one or more stored transmission matrices, which are each associated with a predetermined location. For example, in the exemplary case using four antennae, a distance, d, between the transmission matrix and a stored transmission matrix may be determined using the formula:

$$d = \sum_{k=1}^{4} (\lambda_k - \lambda_k')^2,$$

where $\lambda_k$ and $\lambda_k'$ are the singular values of the transmission matrix, H, and a stored transmission matrix, H', respectively. The nearest neighbor may be determined by finding a minimal value of the distance, d, from among the stored transmission matrices. The portion of the transmission matrix may then be associated (at 520) with the predetermined location corresponding to the nearest neighbor stored transmission matrix. However, persons of ordinary skill in the art will appreciate that the aforementioned nearest neighbor calculation is exemplary in nature and not intended to limit the present invention, except as set forth in the appended claims. In alternative embodiments, the portion of the transmission matrix may be associated (at 520) with the predetermined location in any desirable manner.

In one embodiment, a location of the mobile unit may be estimated (at 530) in response to associating (at 520) the portion of the transmission matrix with the predetermined location. For example, if the portion of the transmission matrix is associated (at 520) with the location of the window 150(3) shown in FIG. 1, the location of the mobile unit may be estimated (at 530) to be the same as the window 150(3). Location-dependent information may then be provided (at 540) to the mobile unit using the estimated location of the mobile unit.

The system and methods described above may have a number of advantages over known tracking techniques. The calibration and/or tracking methods described above may be implemented using only one access point, although more than one access point may be used if so desired. The aforementioned transmissions may be performed using one frequency channel and it is not necessary to tune nearby access points to a particular channel of the mobile unit, as is required in RSSI and TDOA techniques. Consequently, the present tracking techniques may result in better performance than the RSSI and TDOA techniques. Moreover, the present invention may exhibit better performance in multi-path rich environments and therefore may be better suited for indoor applications than traditional techniques such as RSSI and TDOA.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of calibrating a wireless tracking system, comprising:
   providing at least one calibration signal using a mobile unit having a first plurality of antennae while the mobile unit is proximate at least one predetermined location;
   receiving a plurality of signals at a second plurality of antennae in response to providing the at least one calibration signal;
   determining a portion of a transmission matrix using the plurality of received signals and the at least one calibration signal; and
   associating the portion of the transmission matrix with the predetermined location, wherein associating the portion of the transmission matrix with the predetermined location comprises associating the portion of the transmission matrix with the predetermined location using a portion of at least one stored transmission matrix, and wherein the portion of the at least one stored transmission matrix is associated with the predetermined location.

2. The method of claim 1, wherein receiving the plurality of signals comprises receiving a plurality of signals that traveled along different paths from the first plurality of antennae to the second plurality of antennae.

3. The method of claim 1, wherein providing the at least one calibration signal comprises providing at least one pilot signal.

4. The method of claim 3, wherein determining the portion of the transmission matrix comprises determining the elements of the transmission matrix.

5. The method of claim 4, wherein determining the elements of the transmission matrix comprises determining the elements of the transmission matrix using the at least one training sequence.

6. The method of claim 5, wherein determining the portion of the transmission matrix comprises determining at least one of a singular value, an eigenvalue, and an eigenvector of the transmission matrix.

7. The method of claim 1, wherein providing the at least one calibration signal while the mobile unit is proximate the at least one predetermined location comprises providing a plurality of calibration signals while the mobile unit is proximate each of the corresponding plurality of calibration signals while the mobile unit is proximate each of a corresponding plurality of predetermined locations.

8. The method of claim 1, wherein storing the determined portion of the transmission matrix and the associated predetermined location comprises storing the determined portion of the transmission matrix and the associated predetermined location in a database.

9. A method of tracking a mobile unit in a wireless local area network, comprising:
   receiving a plurality of signals at a first plurality of antennae;
   determining a portion of a transmission matrix using the plurality of received signals; and
   associating the portion of the transmission matrix with the predetermined location, wherein associating the portion of the transmission matrix with the predetermined location comprises associating the portion of the transmission matrix with the predetermined location using a portion of at least one stored transmission matrix, and wherein the portion of the at least one stored transmission matrix is associated with the predetermined location.

10. The method of claim 9, wherein determining the portion of the transmission matrix comprises determining a plurality of elements of the transmission matrix.

11. The method of claim 10, wherein determining a portion of the transmission matrix comprises determining at least one of a singular value, an eigenvalue, and an eigenvector of the transmission matrix using the plurality of elements of the transmission matrix.

12. The method of claim 9, wherein associating the portion of the transmission matrix with the predetermined location using the portion of the at least one stored transmission matrix comprises determining a nearest neighbor to the portion of the transmission matrix using a portion of the at least one stored transmission matrix.

13. The method of claim 9, wherein receiving the plurality of signals comprises receiving a plurality of signals provided by a second plurality of antennae.

14. The method of claim 13, wherein receiving the plurality of signals comprises receiving a plurality of signals that traveled along different paths from the second plurality of antennae to the first plurality of antennae.

15. The method of claim 13, wherein receiving the plurality of signals provided by the second plurality of antennae comprises receiving the plurality of signals at the first plurality of antennae coupled to an access point and provided by the second plurality of antennae coupled to a mobile unit.

16. The method of claim 15, wherein determining the portion of the transmission matrix comprises determining a portion of the transmission matrix at the access point.

17. The method of claim 13, wherein receiving the plurality of signals provided by the second plurality of antennae comprises receiving the plurality of signals at the first plurality of antennae coupled to at least one mobile unit and provided by the second plurality of antennae coupled to an access point.

18. The method of claim 17, wherein determining a portion of a transmission matrix comprises determining the portion of the transmission matrix at the mobile unit.

19. The method of claim 18, further comprising providing the determined portion of the transmission matrix to the access point.

20. The method of claim 9, wherein receiving the plurality of signals comprises receiving at least on pilot signal.

21. The method of claim 9, wherein receiving the plurality of signals at the first plurality of antennae comprises receiving a plurality of signals having a substantially common frequency at the first plurality of antennae.

22. The method of claim 9, further comprising estimating a location of the mobile unit in response to associating the portion of the transmission matrix with the predetermined location.

23. The method of claim 22, further comprising providing location-dependent information to the mobile unit using the estimated location of the mobile unit.

24. A wireless local area network, comprising:
a mobile unit having a first plurality of antennae capable of providing a plurality of signals;
an access point having a second plurality of antennae capable of receiving a plurality of signals in response to the plurality of signals provided by the mobile unit, the access point being capable of:
determining a portion of a transmission matrix using the plurality of received signals; and
associating the portion of the transmission matrix with a predetermined location, wherein associating the portion of the transmission matrix with the predetermined location comprises associating the portion of the transmission matrix with the predetermined location using a portion of at least one stored transmission matrix, and wherein the portion of the at least one stored transmission matrix is associated with the predetermined location.

25. The network of claim 24, wherein the access point is further capable of estimating a location of the mobile unit in response to associating the portion of the transmission matrix with the predetermined location.

26. The network of claim 25, wherein the access point is further capable of providing location-dependent information to the mobile unit using the estimated location of the mobile unit.

* * * * *

UNITED STATES PATENT AND TRADEMARK OFFICE
CERTIFICATE OF CORRECTION

PATENT NO. : 7,164,929 B2 Page 1 of 1
APPLICATION NO. : 10/754428
DATED : January 16, 2007
INVENTOR(S) : Jacob Sharony It is certified that error appears in the above-identified patent and that said Letters Patent is hereby corrected as shown below:

Claim 6, column 9, lines 66-67, delete "elgenvector" and replace with --eigenvector--.

Claim 20, column 11, line 5, delete "on" and replace with --one--.

Signed and Sealed this

Fifteenth Day of May, 2007

JON W. DUDAS
*Director of the United States Patent and Trademark Office*